Figure 5:
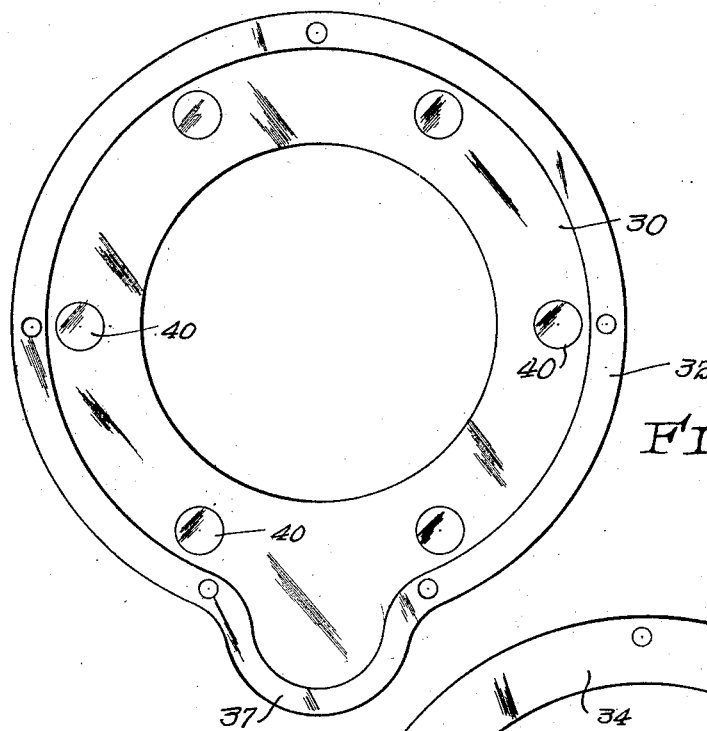

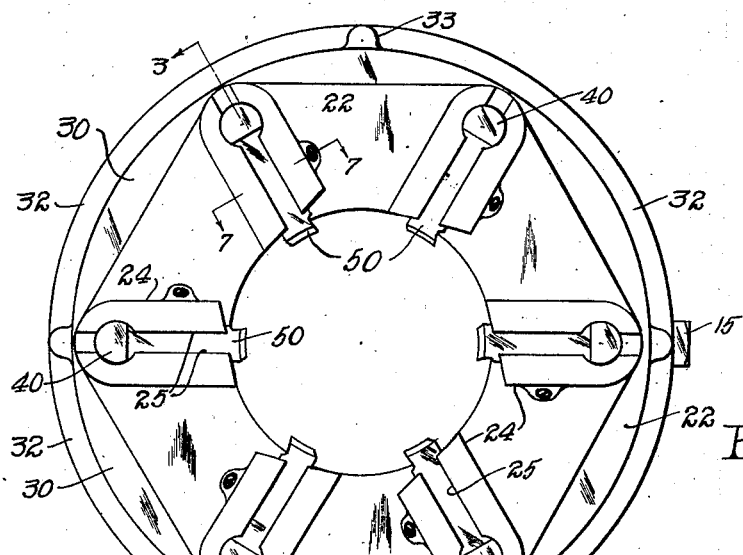
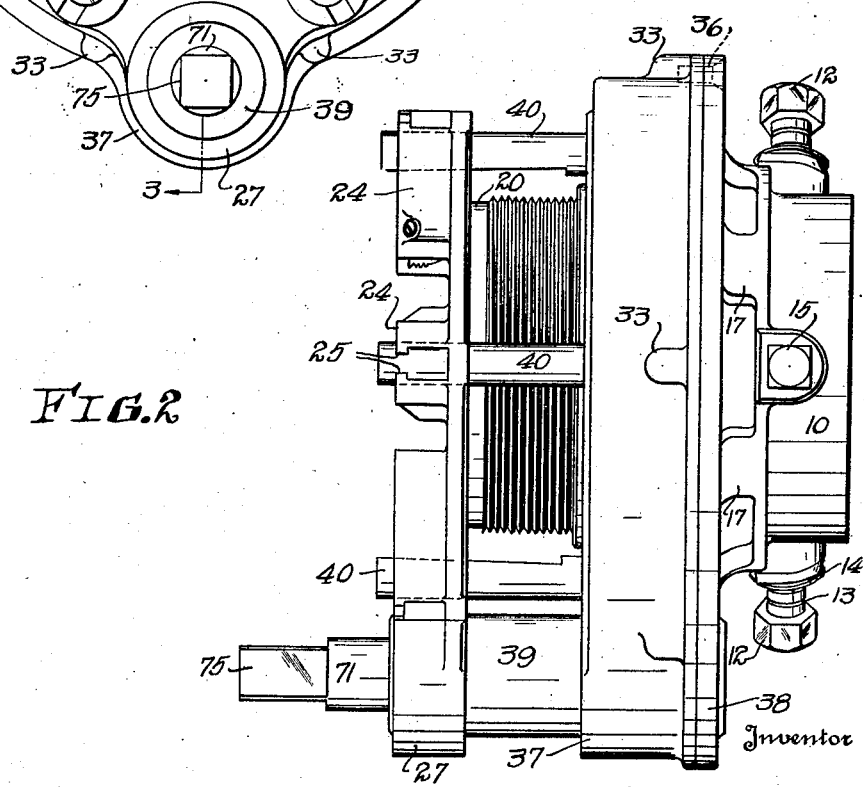

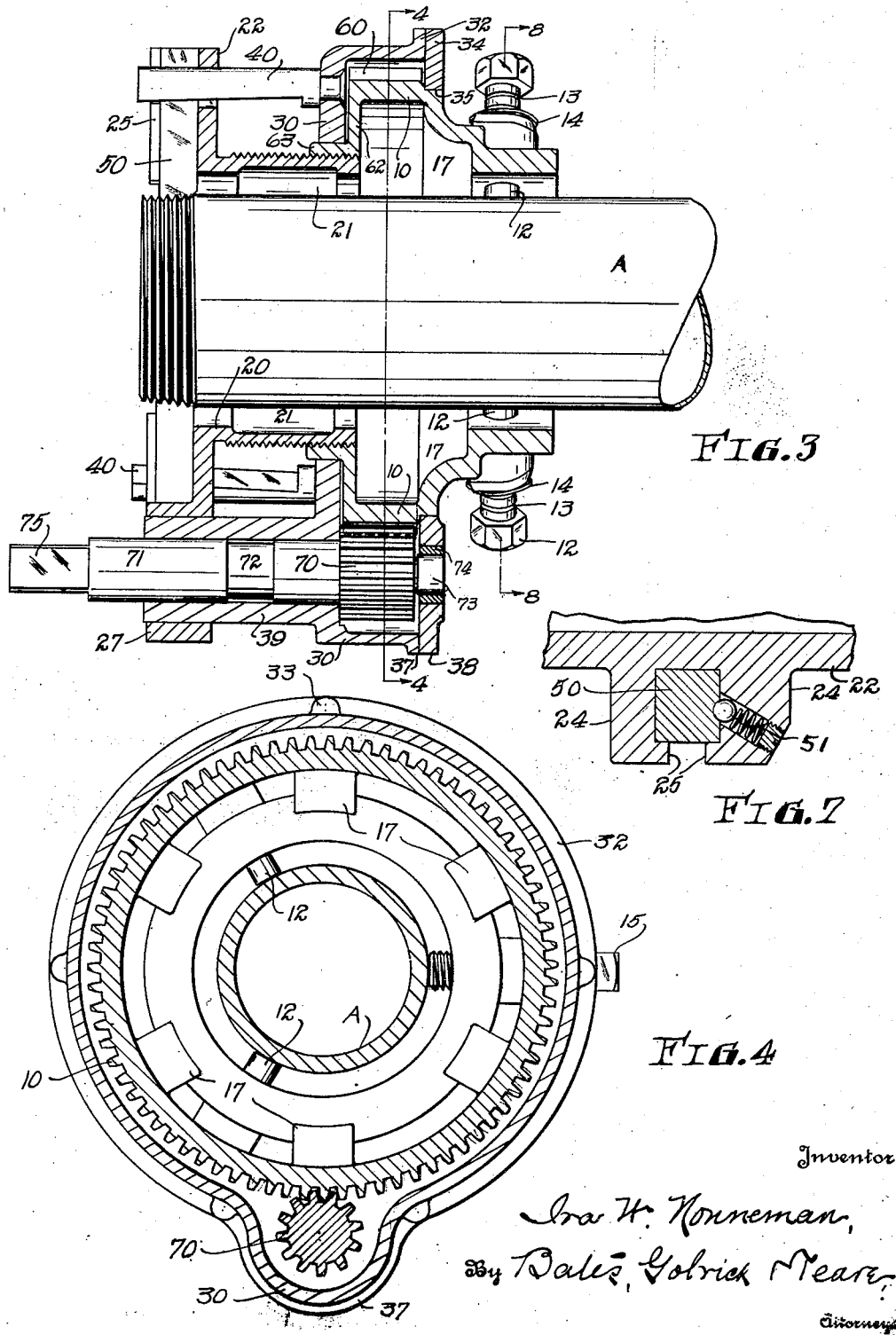

April 5, 1932.  I. W. NONNEMAN  1,852,186

DIESTOCK

Filed May 13, 1930  3 Sheets-Sheet 3

Inventor

Ira W. Nonneman,
By Bates, Golrick & Fearz
Attorneys

Patented Apr. 5, 1932

1,852,186

UNITED STATES PATENT OFFICE

IRA W. NONNEMAN, OF WARREN, OHIO, ASSIGNOR TO THE BORDEN COMPANY, OF WARREN, OHIO, A CORPORATION OF OHIO

DIESTOCK

Application filed May 13, 1930. Serial No. 452,032.

This invention relates to die stocks of the type having a chaser frame connected by a lead screw with the work holder, the work holder being provided with a stationary gear, with which meshes a driving pinion on a shaft traveling bodily with the rotation of the chaser frame, so that powerful means is provided for turning the chaser frame. The die stock is preferably of the receding type, the recession of the chasers being controlled by tapered pins carried by a ring rotatable on the work holder.

One of the objects of the invention is to so arrange such a die stock that the gear and pinion shall be entirely enclosed within the die stock, and thus damage to the parts by chips or dirt will be avoided.

Another object of the invention is to provide a very effective means for supporting the driving shaft and for mounting the pinion of that shaft.

My invention is illustrated in the drawings hereof and is hereinafter more fully explained, and the essential novel features are summarized in the claims.

Figure 6:
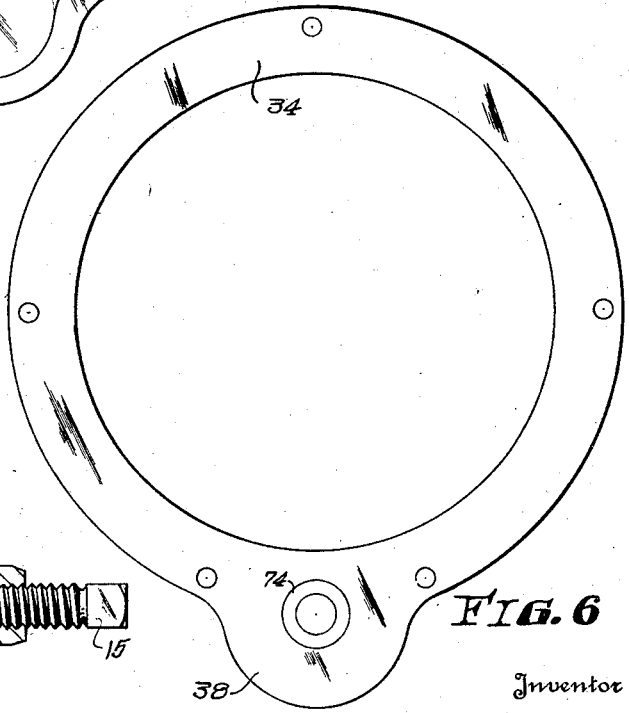
Figure 8:
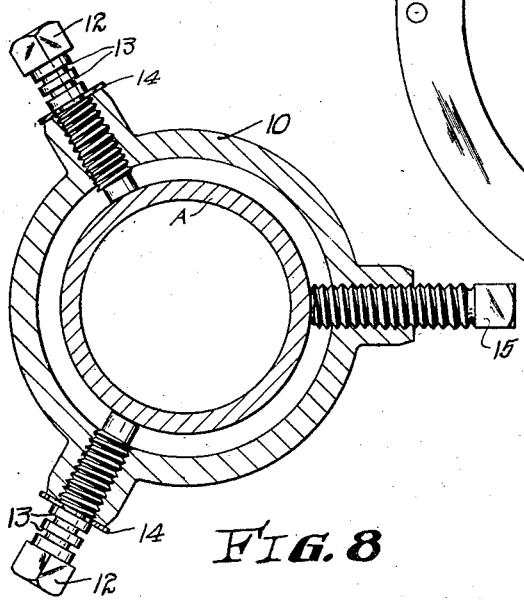

In the drawings, Fig. 1 is a face view of the die stock; Fig. 2 is an edge view of the same; Fig. 3 is an axial section as indicated by the line 3—3 on Fig. 1; Fig. 4 is a transverse section parallel with Fig. 1 substantially in a plane indicated by the line 4—4 on Fig. 3; Fig. 5 is a view of the rotatable recession controller; Fig. 6 is a view of the locking ring for the recession controller; Fig. 7 is a fragmentary section across one of the chaser housings as indicated by the line 7—7 on Fig. 1; Fig. 8 is a transverse section through the work holder.

In Fig. 3 of the drawings, A indicates a pipe being threaded. Surrounding this pipe and clamped to it, is a tubular frame 10, commonly called a work holder. This frame has any suitable means for clamping it to the pipe. I have shown in Figs. 2 and 8 two radial screws 12, 120° apart, adapted to be accurately positioned for different sizes of pipe, and a third screw 15, 120° from the other two, which operates as a clamping screw. The screws 12 are shown as provided with a series of grooves 13, any of which may accommodate a loose washer 14, whereby a readily changeable abutment is provided variably limiting the innermost position of the screw.

My die stock is intended principally for large sizes of pipe and is adapted for various sizes within its range, as for instance, 2½", 3", 3½" and 4" sizes. When so designed, the grooves 13 and the position of the head on the strop screws would be correspondingly selected. This construction however constitutes no part of the present invention.

Threaded internally into the work holder sleeve 10, is a sleeve 21 of a rotary chaser carrying frame 20. This frame 20 may be made of a single integral casting comprising, beside the externally threaded sleeve 21, the disk-like radial head 22 having on its outer face housings for radial chasers. I have shown six of these housings spaced equi-distant about the head, each housing comprising two parallel ribs 24 spaced apart to provide a continuous open space between them, the ribs having inwardly overhanging flanges 25 to slidably confine the chaser 50. These chasers are prevented from dropping inwardly when the die stock is idle by detents comprising spring pressed balls 51, as shown in Fig. 7.

Surrounding the work holder and rotatably mounted thereon is a rotary ring 30 hereinafter described in detail. Equi-distantly mounted on this ring 30 are pins 40, one for each chaser. These pins are rigidly mounted on the ring and extend parallel with the axis of the die stock, except that the inner face of the pins is inclined away from the axis measured from the free end of the pin toward its anchorage in the ring. These pins extend through the chaser head 20 and between the ribs 24 thereof and form abutments for the chasers 50, slidably mounted in the chaser housings. It thus results that as the chaser head travels toward the work holder during the rotation of the head a more distant surface of the pin constantly comes into coaction with the chaser so that the chaser gradually recedes during the cutting, giving the tapered thread desired.

The construction so far described is substantially that set out in my pending application No. 420,362, filed January 13th, 1930. In that case however, I provide a ratchet mechanism to feed the chaser head by direct manual power. In the present invention reduction gearing is provided which gives the necessary power and thus enables the die stock to be utilizable for cutting threads on large size pipes. Reduction gearing in a die stock is an old feature, but I have provided it in a form which has the great advantage of being entirely enclosed so that it will not be damaged by chips or dirt. This construction will now be specifically described, with reference more particularly to Figs. 2, 3, 4, 5 and 7.

The work holder 10 has outwardly diverging arms 17 extending from the body portion which carries the screws 12 and 15. These arms at their outer ends merge with an external spur gear 60. This gear is a hollow annular member having at the edge opposite the arms 17 an inwardly extending radial flange portion 62, at the inner edge of which is a cylindrical flange 63 extending away from the work holder screws and internally threaded to receive the external lead screw of the chaser frame. This internally threaded portion, the radial portion, the external gear, the connecting arms, and the sleeve carrying the screws, are preferably all one integral casting.

The rotary ring 30 which carries the taper posts is mounted about the cylindrical flange 63 and bears against a portion of the disk flange 62. This ring is held in place by having a peripheral flange 32 which extends about the exterior of the gear 60 and is for the most part parallel therewith, this flange carrying at its far end a locking ring 34 which overhangs the gear and seats on a concentric shoulder of the work holder as shown at 35. This ring is shown as held to the ring 30 by screws 36 shown as counter-sunk in the ring 34 and extending into bosses 33 on the peripheral flange 32 of the ring 30.

I have referred to the post ring flange 32 as extending for the most part concentrically about the gear 60. In one region however, the flange 32 bears outwardly away from the gear in an approximately semi-cylindrical offset 37 as shown in Fig. 4. The locking ring is correspondingly extended in this region as shown at 38, and thus a housing is provided for the driving pinion 70 which meshes with the gear.

The pinion 70 is formed rigidly on the driving shaft 71 which lies parallel with the axis of the die stock and travels bodily with the chaser frame in its rotary movement. One of the features of the invention comprises the means by which I obtain effective bearing for this driving shaft.

To the above end, I form a sleeve portion 39 on the ring 30 which extends slidably through an ear-like portion 27 on the chaser frame. This sleeve 39 may form an integral part of the ring 30, is so shown; in any event, it is secured rigidly to that frame. By reason of the snug but sliding fit of the sleeve 39 in the chaser frame, the ring and chaser frame are rotatably bound together, though the chaser frame is free to approach the ring during rotation. The shaft 71 is preferably intermediately recessed as shown at 72 to provide an oil reservoir and to give the shaft spaced bearings in the sleeve. The pinion 70 is preferably an integral part of the shaft 71. Beyond the pinion I form an integral stud 73 which has a bearing in a bushing 74 set into the locking ring 38.

The mounting above described, gives a very firm journalling of the shaft and pinion, enabling the latter to maintain a proper engagement with the stationary gear at all times, irrespective of the amount of power which may be applied to the projecting end 75 of the shaft.

It will be seen that when the work holder is clamped on the pipe, and a crank or other driving device, applied to the shaft end 75, the rotation of the crank will cause the pinion to travel slowly about the stationary gear 60 and thereby carry around the pin-carrying ring and the chaser head and thus effect the threading. The stiff sleeve on the pin-carrying ring, and the tapered pins, having a sliding fit with the die head furnish effective means for transmitting motion from the ring to the die head, so that the pin-ring and die head will operate as a unit—except that the die head constantly approaches the ring due to the lead screw, which, by reason of the tapered pins, allows the chasers to recede.

The axis of the crank, if such is employed, travels about the pipe axis during this threading, but this does not interfere with the efficiency of manual rotation of the crank. However, if it be desired to drive the die stock by power, this may readily be effected by a motor axially aligned with the die stock and some distance from it, the armature shaft being connected with the drive shaft by a long inclined shaft having universal joints at its opposite ends, as will be readily understood.

I claim:—

1. The combination of a work holder adapted to be clamped to a pipe and having an external gear, a ring mounted on the work holder concentric of its axis to rotate thereon, said ring having a peripheral flange surrounding the gear, such flange being offset outwardly in one region, the ring being held on the work holder by a removable locking ring rigidly secured to said peripheral flange and having a corresponding offset, a pinion located in the offset housing provided by the flange of the first mentioned ring and the locking ring, a chaser-carrying frame, a rigid sleeve carried by the first mentioned ring concentric of the pinion axis and extending slidably through the chaser frame, and a shaft having a bearing in said sleeve and carrying the pinion near the inner end of the shaft, the outer end of the shaft being formed for attachment of the power.

2. The combination of a work holder adapted to be clamped to a pipe and having an external gear with its pitch circle concentric of the axis of the work holder, a ring mounted on the work holder concentric of its axis to rotate thereon, said ring having a peripheral portion housing the gear and for the most part concentric thereof, such peripheral portion being offset outwardly in one region, the ring being held on the work holder by a removable locking ring rigidly secured to the first mentioned ring and having a corresponding offset, a pinion located in the offset housing provided by the composite ring, means for rotating said pinion to carry the composite ring about the work holder, a chaser-carrying frame having a lead screw connection with the work holder, tapered pins carried by the composite ring adapted to coact with the chasers on the chaser frame, and a shaft having a bearing in said composite ring and carrying the pinion and extending slidably through the chaser-carrying frame.

3. In a die stock, the combination of a work holder, a chaser frame having a lead-screw engagement with the work holder, an external gear on the work holder, an annular member rotatable on the work holder and having a bearing thereon on each side of the gear and extending over the face of the gear to provide a housing entirely enclosing the gear teeth, a pinion mounted within said housing and enclosed by it and meshing with the gear, and a shaft traveling with the chaser frame and carrying the pinion and having bearings on each side of the pinion in the two parts of the housing.

4. In a die stock, the combination of a work holder, a stationary gear carried thereby, a hollow annular rotatable housing having bearings on the work holder on each side of the gear, a sleeve carried by the annular member, a chaser frame having a lead-screw connection with the work holder, the sleeve extending slidably through an opening in the chaser frame, a shaft journalled in said sleeve, a pinion on the shaft meshing with the gear and an extension of the shaft beyond the pinion also journalled in the rotatable housing.

5. In a die stock, the combination of a work holder, a chaser frame having a lead-screw connection with the work holder, a stationary gear on the work holder, a rotatable member on the work holder comprising two rings and a peripheral portion rigidly connected with both rings to make a hollow shield surrounding the gear and protecting the gear teeth, the ring on the side adjacent the chaser frame having a rigid sleeve slidably extending through an opening in the chaser frame, a shaft having a bearing in said sleeve and projecting beyond it and there formed for the attachment of a driving device, and a pinion on the shaft between the rings and within the peripheral portion and meshing with the gear.

In testimony whereof, I hereunto affix my signature.

IRA W. NONNEMAN.